Patented Apr. 7, 1942

2,278,467

UNITED STATES PATENT OFFICE 2,278,467

NUT

Albert Musher, New York, N. Y., assignor, by mesne assignments, to Food Manufacturing Corporation, Chicago, Ill., a corporation of New York No Drawing. Application July 7, 1939, Serial No. 283,192

7 Claims. (Cl. 99—128)

The present application relates particularly to nuts, and especially it relates to the explosion or expansion of nuts so as to provide substantially new and enhanced qualities of softness, disintegratability, and various other new and enhanced characteristics.

Because of the relative hardness or toughness of shelled nuts, they offer difficulty with many people with reference to their hard chewable nature.

Also, in view of the fibrous or hard nature of many nuts, they are found, in many cases, to be of a relatively hard-to-digest nature.

Still further, in view of the fact that nuts generally contain a rather high oil content, many consumers do not frequently use them in view of their disinclination towards foods of high oil or fat content.

It is therefore among the objects of the present invention to provide nuts in a relatively softer and more chewable condition.

It is also among the objects of the present invention to provide nuts which have substantially quicker disintegratable qualities, and which form much more quickly into individual nut particles when these products are utilized either in their raw condition, or in conjunction with baking or other cooking procedures.

It is further among the objects of the present invention to provide an entirely new kind of nut product in which a good part of the oil has been substantially removed from the nut, while the nut still retains substantially its original form and shape.

A still further object of the present invention is to provide nuts which will produce new and enhanced nut butters, nut pastes, and similar ground, or finely divided nuts.

Still further objects and advantages will appear in the more detailed description set forth below, it being understood, however, that this more detailed description is given by way of illustration and explanation only, and not by way of limitation, since various changes therein may be made by those skilled in the art without departing from the scope and spirit of the present invention.

It has now been found that the above objects may be accomplished by subjecting the nut to an increased temperature and pressure, and after the required length of time, suddenly releasing it to a substantially lower temperature and pressure. The use of this process in conjunction with various accessory procedures as for instance freezing, cooking, enzymic action, steaming, or combinations thereof, will produce different or enhanced products as may be required.

Examples of various nuts that may be used in conjunction with this invention are, for instance walnuts, almonds, pecans, hickory nuts, filberts, Brazil nuts, beechnuts, and so forth.

In carrying out this invention, the pressure to which the nuts are subjected in the expansion procedure should usually be above 20 or 25 pounds per square inch and preferably should be above 40 or 45 pounds per square inch, and in some cases it may run as high as 350 or 450 pounds, or more, per square inch.

Generally, the temperature should be above 200° F. to 250° F., and it may run above 700° F. to 800° F. However, usually, the general range is between about 350° F. and 550° F.

The required time for explosion may be 12 to 15 minutes or longer, or it may be under 10 minutes or even less than several minutes, whereas in many cases it may be under one minute, and also several seconds or 15 to 45 seconds will suffice to complete the treatment and give the best results.

The explosion treatment is carried on for a time period and at a temperature and pressure depending upon a number of factors, as for instance, the moisture content of the nuts, the softness or hardness of the nuts, the degree of expansion desired, the type of equipment used, whether dry heat or steam or superheated steam is used for the expansion chamber, and also, depending upon the time, temperature and pressure variations themselves.

If the product to be exploded is a little too dry in order to effect the required explosion, additional moisture may be added to the product or to the pressure chamber, as for example in the form of water or other aqueous materials, or in the form of steam or superheated steam.

The expansion or explosion treatment is generally carried out, in one of its preferred embodiments, in a steam atmosphere, which steam may be developed by various methods as for instance, from the moisture within the nut that is being processed or by injecting into the pressure chamber of steam, etc. The steam may be controlled so as to maintain or change the moisture content of the product being treated, and so as to obtain the best results.

After this treatment at elevated temperatures and pressures the nut is suddenly and instantaneously released to atmospheric temperature and pressure, or to a substantially lower temperature and pressure, as for instance, by suddenly opening the particular vessel in which the nuts have been treated, which vessel may be a pressure gun or other suitable apparatus.

After the nuts have been treated in accord with the process herein described, it is found that their texture or structure is usually of a relatively changed nature, and that the structure is relatively disrupted either in its body or in its cell structure.

With many nuts it will be found that their fibers or cells have been to a large degree torn, separated, or softened, and that a large number of passages and pores, in many cases, have been formed. Many of these pores are at times greater than capillary size and many of them may be of a communicating nature.

As a result of this explosion procedure, it will be found that there is a softness that is developed in the nut piece, or that quicker disintegratability of the nut meat is now possible.

As one example of the procedure for exploding some types of nuts, the nuts may be subjected to a temperature of about 450° F. to 500° F. in a superheated steam atmosphere for a time period of about 20 to 30 seconds, and at a pressure of around 60 to 65 pounds per square inch. At the end of this time period they may be instantaneously released to atmospheric temperature and pressure so that they may result in the exploded or expanded product of this invention.

In the carrying out of this invention, although these nuts may be ejected from the pressure chamber into atmospheric conditions, nevertheless, so as to control the porosity and other characteristics, and also so as to develop variations, and also so as to produce protective qualities for the nuts, they may be ejected into high or lower pressures than atmospheric, or into a partial or complete vacuum, or into atmospheres that may contain carbon dioxide, nitrogen, or ozone, or into oil or aqueous vapors, or, if desired, they may be ejected or placed, after explosion, into molten hard fat, or into molten sugar, sugar syrup, or liquid oil.

In many cases it may be preferred, instead of carrying out this expansion or explosion procedure in a single step, to carry it out in a plurality of steps in which different pressures and temperatures and time periods may be utilized. For example, the nuts may be subjected to one, or two, or three, or more explosion or expansion treatments at temperatures, pressures, and time periods that are the same as each other, or that vary from each other, either higher or lower.

The carrying out of the expansion or explosion procedure in multiple steps as herein described is of advantage, particularly in those cases where the high heat or pressure of the single explosion procedure would damage or deteriorate various qualities or characteristics of the nut. Therefore, this explosion or expansion procedure may now be carried out in a series of steps, each of which steps may be at a temperature and pressure that does not substantially harm the food or flavor elements, but which in the aggregate of the multiple steps, provides the results that are desired.

Particularly, however, the multiple expansion or explosion procedure is of advantage with hard nuts, in view of the fact that the single explosion, particularly at temperatures and pressures that would not harm the product, is, in many cases, not sufficient to produce the softness or disintegratable quality that is desired. Therefore, a series of expansion or explosion treatments at the same, or increased, or reduced temperatures, pressures, and time limits, will enable the production of nuts that have substantially greater softness or disintegratable quality, and that have substantially new qualities as compared with nuts that have been treated under the single explosion procedure.

It is desirable, at times, to place a coating on or within the nuts so as to permit the formation of harder walls and thereby so as to result in a greater or more efficient explosion of the product. Starch, resins, sugars, gums, and similar materials may be used to provide such a coating, as, for instance, by mixing these materials with water or aqueous materials, then coating the nuts, and then allowing to dry thereon.

Following the explosion operation, whether or not the nuts have been chopped, or pulverized, or otherwise treated, they may be dipped into, or coated with a plastic or molten fat to retard discoloration, etc., or they may be similarly treated with molten sugar, or with chocolate, or with fatty materials so as to produce further protection qualities.

An important advantage of the present invention resides in the fact that the explosion or expansion treatment will separate the fibrous, or resinous, or similar hard structure of the nuts so that the digestion qualities of these exploded nuts will be greatly improved. This is particularly important in view of the fact that some nuts are of an indigestible quality due to their toughness and hard structure, and this is thereby avoided or lessened to a remarkable degree by this new procedure.

The nuts which are obtained following explosion may be coated, impregnated, or otherwise treated to render them less susceptible to oxidation, or deterioration, or to enable them to better retain therein moisture, flavor, and softness.

For example, the resulting product of the procedures herein described, may be coated with various preservatives, or protectives against deterioration, either dry, or mixed with liquid materials, or the nuts may be coated with fats or oils at reduced or increased temperatures, or they may be dusted or coated or impregnated with flavoring materials such as sugar, salt, condiments, essential oils, extracts, various types of flavors, etc., either in dry, or liquid, or dissolved form.

In the carrying out of this invention it is generally desirable to use nuts of a relatively low starch content, and particularly of a relatively low insoluble starch content, as for instance below about 25% to 30% of starch, and preferably less than 12% to 14%, and in many cases less than 5% to 6%. At least, the starch that is present, should be of such nature and of such small amount that there will be substantially no tendency for the starch granules when they are exploded during the procedures herein described, to produce a product that is relatively collapsible, particularly when placed in water.

In the carrying out of this invention it is many times desirable to coat, impregnate, or otherwise protect the products of this invention with protective materials and particularly with water repellent materials such as oils and fats, and preferably with fats which are in a plastic or hardened condition at room temperature. However, under various conditions, various other materials or combinations thereof may be used for impregnation, coating, etc., as for instance, sugar, preferably when it is of a quickly dissolvable nature. Examples of various fats and oils that may be used in the various embodiments of this invention are for instance, corn oil, olive oil, sesame oil, palm kernel stearin, hydrogenated cottonseed oil, oleostearin, and so forth.

Also, fats of a hardened or plastic nature such as those described above, or other materials, or sugars, or products containing sugars, or fats such as chocolate, etc., may be used as binding agents to bind together the exploded nuts of this invention either by themselves, or in conjunction with other food materials. They may thereby be bound together into cakes, briquettes or into other individual units.

The advantage of using the exploded nuts of this invention in conjunction with the binding procedure is of importance in view of the fact that because of the explosion procedure there is developed various crevices, interstices and pores within the exploded nut, and there is thereby enabled the entrance and anchoring of the liquid binding material within these pores and interstices, etc., so as to form a relatively more substantial food unit.

In the carrying out of this invention, the explosion or expansion procedure may be adjusted so that the nuts will retain substantially their unity following the explosion.

Also, it is advantageous, particularly with large nuts, to cut or break them into relatively smaller pieces before the explosion procedure, so that their interior portions will be more exposed. As a result of cutting or breaking these nuts into smaller portions, there will tend to be formed in the resultant product a product with more widely distributed pores and exploded parts.

Particularly where the nut pieces are to be used for cooking purposes, it is generally advisable to have at least 2% to 3% of moisture remain within the final product, or even to have above 5% to 8% moisture in the final product in order to enable more ready cookability. This is generally not readily available when the product is entirely dried out. This also has the advantage of enabling the retention of at least some of the water soluble flavors so as to enhance the flavor element.

Aside from the explosion procedures as herein described, various other accessory procedures may be used in order to enhance the structure, fiber, and cell disruption of the nuts, and in order to provide new qualities and characteristics. For instance, there may be used operations involving soaking or boiling in oil or fat, or roasting in oil, or dry roasting, or freezing, cooking, steaming, or the use of enzymes, or various combinations of these processes.

These procedures may be used at various points as, for instance, preliminary to, after, or as an accessory to the explosion operation, so as to further soften the fibers or structure, and thereby enhance the desired qualities.

As a possible embodiment of this invention the nut pieces may be cooked or steamed to rupture or soften their body or cell structure, and then the nuts may be dehydrated to a sufficiently low moisture content so as to enable the proper expansion or explosion operation. This cooking operation may be carried on for such a period of time so as to produce the required softness.

It is generally preferable in carrying out this embodiment to control the cooking process so as to retain as much as possible of the water soluble flavors and other flavors, essences, and qualities of the nut pieces. This is usually done by such methods as cooking or steaming under vacuum or under pressure, for instance, or in the presence of inert gases such as carbon dioxide, nitrogen and so forth.

Another embodiment of this invention that may be used in order to enhance the softness, or the quick disintegratability, or the disruption, etc., of the products of this invention, is to subject them to a freezing operation, and particularly to a slow freezing operation which will have the effect of rupturing the cells or softening the fiber and cell structure.

In subjecting these materials to a freezing operation, the amount of moisture, and the temperatures that are required in order to produce the best results may vary depending upon the degree of softening and rupturing of the cell structure that is desired, or upon the nature of the nuts themselves. However, it has been found that good results are usually obtained when the moisture content varies for example over 30% to 40%. Likewise it has been found desirable in many cases, to permit the freezing to take place slowly and at temperatures ranging between 0° F. and 32° F., although in many cases preferred temperatures run down to minus 20° F. and minus 40° F. and lower. Varying temperatures further may be used for varying lengths of time.

In general, it should be said that it is desirable to carry out the freezing treatment in such a way that there will not be the formation of small fine ice crystals that do not result in rupture of the cells and structure, but rather, there should be formed relatively large ice crystals sufficient to puncture, break, rupture or disrupt the cell structure or the body structure substantially throughout the nut piece.

For both the cooking as well as for the freezing operations, the water should be present in sufficient amount so that it is carried substantially throughout the nut, and preferably it should be as uniformly distributed as possible so that the entire structure of the nut piece will be affected.

The cooking or freezing procedures in conjunction with the explosion procedure as herein described, will produce entirely new degrees of softness and edibility, and new types of products.

In many cases, it is even desirable to combine various accessory procedures. For instance, it may be desirable in some cases to first cook or steam the nut as herein described, and then to subject the nut to the freezing operation after the cooking procedure.

Following the cooking or freezing procedure, the nuts are then dried, prior to the explosion or expansion procedure. This is necessary in order to produce a firmer or harder structure so as to enable the proper explosion, and structure disruption. In the drying procedure, various drying methods may be used such as heat, or hot air, at such temperatures and for such lengths of time so as to reduce the water content generally to below 30% to 35%, and preferably to below 15% or 20%, and in many cases to below 8% to 10%. Following the dehydration procedure, the nuts are then ready for the explosion procedure.

The freezing, cooking, dehydrating, and explosion procedures may be varied and intermingled as desired, one or more times, in order to produce the type of product desired. For example, if desired, the nut may be first exploded or expanded, and then it may be subjected to the cooking and freezing procedures. Following the explosion, the water of the cooking or freezing procedure will be better enabled to get more thoroughly within the structure of the nut. Following this, the nut may be dehydrated, and exploded again, if desired.

In the freezing, or cooking, or steaming operations of this invention, it is at times desirable, particularly where the nuts are of large size, to cut them into relatively smaller sizes, so as to enable a more complete and more thorough penetration of the cooking, steaming, or other processes herein described.

For the drying procedure of the various embodiments of this invention, it is desirable to carry out the procedure in such a way so that the nuts will oxidize as little as possible. For this reason the drying may be carried out if desired under vacuum, or in an atmosphere of carbon dioxide, or nitrogen, or in other inert atmospheres, although, of course, they may be dried under atmospheric conditions, if desired.

Instead of drying the nut materials with a dry heat, at various points throughout the procedure as herein described, these materials may be placed into a liquid oil or into a molten hard fat and dried into the required moisture content.

As a further embodiment of this invention, the nuts may be roasted, either dry, or in oil prior to the explosion procedure, or following the explosion procedure.

In the preparation of roasted almonds, or other roasted nuts, there is a substantial improvement in the quality of the finished roasted nut, particularly if the roasting takes place after the explosion procedure. This is due to the fact that the roasting operation can now take place more uniformly within the nut, in view of the fact that the structure has been disrupted, and the heat of the roasting procedure can now more easily and more uniformly enter within the nut piece.

Also, entirely new and enhanced qualities are formed by grinding or similarly treating the exploded nuts of this invention, in the preparation, for instance, of nut butters or pastes as for instance, almond paste, and so forth. By the use of the procedures as herein described, and the grinding of these nuts, there can be produced a relatively new type of grind. Also the resultant product will have considerably enhanced flavor and texture qualities.

Furthermore, the nut produced in accord with this invention, in its whole form, not only has the increased softness or new disintegratable quality, but there seems to be an apparent development and intensification of its flavor, probably due to the fact that in the rupturing of the cell structure, the flavoring materials, and essential oils, and so forth are produced in a substantially more free condition.

In carrying out this invention with nuts that contain amounts of starch, or protein, or both, and particularly when these materials are present in relatively higher amounts, it is generally desirable to remove these materials or to modify them so that they will not produce a hard or tough structure, or rather, so that the structure of the nut material will be softened, or so that it will be made more digestible.

This procedure of removing or converting the starch or protein material may be carried out in various ways. For instance, cold or warm water may be used to wash out these starch or protein materials by soaking the nuts in water, or by repeated washings, etc. Various other washing materials or solvents, etc., may also be used, as, for instance, salt water, alcohol, acid materials, alkali materials, and so forth, depending upon the nature of the material to be extracted and the end results desired. In the case of many protein materials, for instance, salt water in a concentration of, for example, 2% to 10%, is a good solvent or extracting solution to use.

Also, in many cases, enzymes are very advantageous in the carrying out of this embodiment. In the case of starch, for instance, diastatic enzymes may be used, and in the case of protein materials, proteolytic enzymes may be used. The enzyme action may be started, and then it may be stopped at the required point by the application of heat or by other means.

The enzymes or other materials may be used to convert the starch material into sugar, for instance, or to convert the protein material into amino acids, and, in this way, these materials may be more readily washed out of the nut, or, if desired, the sugar, for example, may be allowed to remain therein in this modified form, whereby there will not be the usual caking or hardening.

In carrying out this embodiment it is not necessary to convert all of the protein or starch material that is present, but a partial amount of either or both of these materials may be converted, or washed out, or modified, so as to produce the required enhancement of the nut material.

Various other procedures, as, for instance, various hydrolyzing procedures may be used to accomplish these results. For example, the starch may be hydrolyzed by the heating of the sugar-containing material in a solution containing a small amount of acid, or, in many cases, the protein-containing material may be placed into a solution of the proper pH, or which is adjusted within the required ranges of the isoelectric point, and then an electric current may be passed through.

In carrying out the various procedures of this embodiment the washing, soaking, enzymic, electrolytic, or other treatments may take place before or after the explosion procedure. In many cases it will be found that it is desirable to first explode the material so as to open or increase the porosity of its structure and thereby so as to permit the various solutions to more easily enter and produce the conversion, modification, or removal result.

In many cases, however, it will be found that more of the starch or protein material may be removed by utilizing one of the conversion or removal procedures named herein before the product has been subjected to any heat, because of the tendency of heat to produce coagulation or fixing, for instance, of the protein or starch, and thereby make it harder to remove these materials therefrom. However, this is subject to experimentation in individual cases, because, as noted herein, it may be possible to produce the result desired, after heat has taken place, or after the explosion procedure.

In many cases, of course, a washing or removal procedure may take place prior to the application of heat, or prior to the explosion procedure, and then another removal or conversion procedure may take place after the heat or explosion procedure, or various sequences or repeated combinations of these procedures may take place as required.

A very important embodiment of this invention further relates to the explosion of nuts so as to have them retain substantially their unity, and, while having them retain this unity, to remove a required amount of oil therefrom by solvents, or by water washing, or by dry heating or roasting, etc. Heretofore, many consumers have found the high oil nature of many nuts, to be disagreeable. However, now, these nuts may retain substantially their original shape and form, but a substantial part of their oil or fat may now be removed therefrom, without disturbing substantially their original condition.

This is accomplished by the explosion procedure of this invention. In this procedure, a substantially large part of the oil cells contained within the nut are broken and the free oil exudes from the nuts, or is loosened from their cells within the nuts. This oil may be wiped off, or hot water washings, or various solvents may be used to remove the top or available portion of oil.

Also, the structure of the nut is now in a relatively disrupted or loosened condition, and therefore, the oil from within the nut can exude, or may be extracted much more easily, particularly where resultant pores, crevices of increased size, etc., and expansion of the nut permits the easier exudation of the oil from the interior portions.

Solvents, also, may now more easily go within the structure of the nut and dissolve or remove portions of the oil therefrom. The ingress of the solvent into the nut is now substantially enhanced in view of the relatively expanded or exploded nature of the nut.

Also, if desired, the nut may be boiled in water, or it may be given a dry heat treatment, or other procedure may be used to force out additional quantities of the oil contained within the nut, and this oil may then be removed therefrom.

In conjunction with this oil removing process, an enhanced explosion procedure may be produced, or various new qualities and types of nut products may be produced by first removing at least a portion of the oil from the nut, as herein described, and then subjecting the nut from which the oil has been removed to another explosion. Aside from resulting in new nut qualities, this procedure of exploding and removing oil may be continued, two, three, or more times, so as to remove increased amounts of oil therefrom.

A still further embodiment of the present invention is that coatings, such as sugar or chocolate coatings are held more firmly and more substantially on nuts that have been exploded in accord with this invention. This is due to the fact that the interstices and crevices and pores that have been formed therein by the explosion procedure, enable the liquid coating material to enter into and anchor itself more thoroughly into these crevices, and thereby the coating material is held thereon more firmly.

In the embodiment of this invention, aside from the explosion and treatment of nuts as herein described, other materials, and particularly relatively hard materials, may be similarly treated so as to produce enhanced qualities of softness, quick disintegratability, and substantially improved edible qualities. For instance, the edible portion of the cocoanut fruit may be cut into relatively smaller pieces and then dried to a low moisture content of, for example, under 10% to 15%, and these pieces may then be exploded and treated as herein described.

Also, for instance, various seeds of a relatively low oil content, and even seeds of a relatively high oil content may be exploded and treated as herein described. Examples of various seeds that may be so treated are orange seeds, apple seeds, watermelon seeds, pumpkin seeds, poppy-seeds, sunflower seeds, and sesame seeds, and so forth, and particularly seeds of a relatively low starch content.

Still further, various other hard materials such as peanuts, for instance, may be treated as herein disclosed, particularly in conjunction with the roasting operation, or the grinding of the peanuts, or the removal of the oil therefrom while permitting the peanuts to retain substantially their original shape and form. For example, the exploded shelled peanuts may be given a dry roast or an oil roast in order to produce peanuts of new and enhanced qualities. Or, exploded shelled peanuts may be ground so as to produce a peanut butter of new flavor and of a new edible quality. Also, the shelled peanuts may be exploded and some of the oil removed therefrom, as herein described, and then, if desired, the peanuts may be subjected to further explosions with further removal of the oil, so as to result in a partially-oil-removed peanut which retains substantially its original form or shape. In the grinding of these exploded peanuts, as with the grinding of the nuts of this invention, there apparently is a tendency for the resultant product to be less oily than heretofore, in view of the apparent increased absorptive quality of the exploded material.

Also, there may be used in conjunction with the procedures herein described, in order to produce enhanced quality, various fruit and other kernels as for instance, cherry kernels, plum kernels, peach kernels, and so forth.

What I claim is:

1. A steam exploded, structure disrupted nut kernel, said nut kernel retaining substantially its original unity.

2. A steam exploded, structure disrupted nut kernel, said nut kernel being in ground condition, and said ground nut kernel exhibiting an enhanced quality of absorbing and retaining therein, the oil that has exuded therefrom.

3. A steam exploded, structure disrupted nut kernel, said nut kernel having at least a portion of its oil removed therefrom, said nut kernel retaining substantially its original form and shape.

4. A roasted, steam exploded, structure disrupted nut kernel, the interior portion of said roasted nut kernel exhibiting a degree of roast substantially equal to the degree of roast in the exterior portion.

5. The method of disrupting the structure of a nut, said method comprising subjecting the nut to steam at an increased temperature and pressure and then suddenly releasing it to a lower temperature and pressure.

6. The method of removing at least a partial amount of the fatty element from a nut while still permitting the nut to retain substantially its original shape and form, said method comprising disrupting the structure of the nut by subjecting it to steam at an increased temperature and pressure and then suddenly releasing the nut to a lower temperature and pressure, and then removing the oil therefrom.

7. The method of removing at least a partial amount of the fatty element from a nut while still permitting the nut to retain substantially its original shape and form, said method comprising disrupting the structure of the nut by subjecting the nut to steam at an increased temperature and pressure and then suddenly releasing the nut to a lower temperature and pressure, and then heating the nut so as to increase the exudation of oil therefrom, and then removing the exuded oil therefrom, followed by a repeated treatment of subjecting the nut to steam at an increased temperature and pressure, suddenly releasing to a lower temperature and pressure, heating the nut, and then removing the oil therefrom.

ALBERT MUSHER.